United States Patent
Lou et al.

(10) Patent No.: US 9,638,791 B2
(45) Date of Patent: May 2, 2017

(54) METHODS AND APPARATUS FOR PERFORMING EXPOSURE ESTIMATION USING A TIME-OF-FLIGHT SENSOR

(71) Applicant: QUALCOMM Incorporated, San Diego, CA (US)

(72) Inventors: Ying Chen Lou, Escondido, CA (US); Hengzhou Ding, San Diego, CA (US); Ruben Manuel Velarde, Chula Vista, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/750,209

(22) Filed: Jun. 25, 2015

(65) Prior Publication Data

US 2016/0377708 A1 Dec. 29, 2016

(51) Int. Cl.
*G01S 7/486* (2006.01)
*G01S 17/89* (2006.01)
*G01S 7/497* (2006.01)
*G01S 17/08* (2006.01)
*H04N 5/232* (2006.01)
*H04N 5/235* (2006.01)

(52) U.S. Cl.
CPC .......... *G01S 7/4865* (2013.01); *G01S 7/4868* (2013.01); *G01S 7/497* (2013.01); *G01S 17/08* (2013.01); *G01S 17/89* (2013.01); *H04N 5/2353* (2013.01); *H04N 5/23212* (2013.01)

(58) Field of Classification Search
CPC ........ G01S 7/4865; G01S 17/08; G01S 17/89; H04N 5/23212; H04N 5/2353
See application file for complete search history.

(56) References Cited

U.S. PATENT DOCUMENTS

| 5,440,369 A | 8/1995 | Tabata et al. |
| 8,218,963 B2 | 7/2012 | Adelsberger et al. |

(Continued)

FOREIGN PATENT DOCUMENTS

| EP | 2017651 A2 | 1/2009 |
| GB | 2084750 A | 4/1982 |

OTHER PUBLICATIONS

Adelsberger R, et al., "Spatially Adaptive Photographic Flash", ETH Zurich, Department of Computer Science, Technical Report No. 612, 2008; pp. 1-12.

(Continued)

*Primary Examiner* — Gevell Selby
(74) *Attorney, Agent, or Firm* — Knobbe Martens Olson & Bear LLP

(57) ABSTRACT

This application relates to capturing an image of a target object using information from a time-of-flight sensor. In one aspect, a method may include a time-of-flight (TOF) system configured to emit light and sense a reflection of the emitted light and may determine a return energy based on the reflection of the emitted light. The method may measure a time between when the light is emitted and when the reflection is sensed and may determine a distance between the target object and the TOF system based on that time. The method may also identify a reflectance of the target object based on the return energy and may determine an exposure level based on a distance between the target object and a reflectance of the target object.

43 Claims, 8 Drawing Sheets

(56) References Cited

U.S. PATENT DOCUMENTS

| | | |
|---|---|---|
| 8,358,370 B2 | 1/2013 | Kleihorst et al. |
| 8,483,557 B1 | 7/2013 | Yost et al. |
| 2005/0147404 A1 | 7/2005 | Takeuchi |
| 2007/0280673 A1* | 12/2007 | Mikami ................ G03B 19/12 396/354 |
| 2008/0106620 A1* | 5/2008 | Sawachi ............ H04N 13/0257 348/262 |
| 2011/0012991 A1* | 1/2011 | Watanabe .......... H04N 13/0055 348/43 |
| 2011/0134220 A1* | 6/2011 | Barbour ............. H04N 13/0207 348/44 |
| 2013/0088576 A1* | 4/2013 | Hsu ................... H04N 13/0271 348/46 |
| 2015/0009396 A1* | 1/2015 | Ueno .................... G03B 15/05 348/362 |

OTHER PUBLICATIONS

International Search Report and Written Opinion—PCT/US2016/029345—ISA/EPO—Jun. 29, 2016.

* cited by examiner

| Distance | LED AEC Estimation Data ||| TOF Sensor Data ||
|---|---|---|---|---|---|
| | Pre-flash Exposure | Pre-flash Luma | Pre-flash Time (s) | Measured Distance (mm) | Signal-noise Ratio (SNR) |
| 10 CM | 249 | 58 | 0.675 | 100.6 | 60.8 |
| 17 CM | 279 | 55 | 0.541 | 172.4 | 11.0 |
| 27 CM | 302 | 49 | 0.541 | 261.5 | 4.1 |
| 43 CM | 340 | 62 | 0.447 | 424.4 | 1.7 |
| ⌐426 | ⌐427 | ⌐428 | ⌐429 | ⌐430 | ⌐431 |

| Object | LED AEC Estimation Data | | | TOF Sensor Data | |
|---|---|---|---|---|---|
| | Pre-flash Exposure | Pre-flash Luma | Pre-flash Time (s) | Measured Distance (mm) | Signal-noise Ratio (SNR) |
| White | 249 | 58 | 0.675 | 100.6 | 60.8 |
| Grey | 313 | 76 | 0.634 | 102.3 | 40.4 |
| Black | 344 | 17 | 0.863 | 106.1 | 21.2 |
| 476 | 477 | 478 | 479 | 480 | 481 |

METHODS AND APPARATUS FOR PERFORMING EXPOSURE ESTIMATION USING A TIME-OF-FLIGHT SENSOR

BACKGROUND

Field

This disclosure generally relates to providing automatic exposure control in photographic and/or other image capture devices. More specifically, this disclosure relates to determining an exposure of a target object using information from a time-of-flight sensor.

Description of the Related Art

Users often experience events which they would like to capture a scene, in photographs or video, and view at a later date and/or time, for example, a child's first steps or words, graduation, or a wedding. Often, these events may be near-static and their occurrence generally predictable (e.g., a wedding, a graduation, a serene landscape, or a portrait) and may be easily captured using an imaging system, e.g., a camera, video recorder, or smartphone. For such moments there may be sufficient time for the imaging system to determine and adjust proper exposure settings to capture the moment event. However, sometimes capturing fast moving scenes with the proper exposure may present a challenge, especially if the scene is temporary (e.g., the scene contains moving objects or the imaging system is subjected to quick panning through a scene having various brightness levels).

Even when the user of the equipment captures an image of a scene at the proper moment or utilizes a multi-shot system, the user must be aware when the event may occur and take into account an imaging system delay for determining focus and exposure. Therefore, the user must be attentive to foresee when such moments will occur and plan accordingly. This can be difficult. Often, at least some portion of the moment or event may have passed without being properly captured. Accordingly, systems and methods to expedite calculating and adjusting exposure of an imaging system would be beneficial.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description," one will understand how the features of the various embodiments of this invention provide advantages that include faster determination of exposure parameters for an imaging system.

One aspect of the subject matter described in the disclosure provides an apparatus for capturing a scene. The apparatus may include a time-of-flight (TOF) system comprising an emitter configured to emit a light signal and a sensing system configured to sense a reflection of the emitted light signal off of a target object and determine a return energy based on the reflection of the emitted light signal. The apparatus further includes a clock coupled to the TOF system, the clock configured to measure a time between when the light signal is emitted and when the emitted light signal is sensed by the sensing system and a processor in communication with the TOF system, the clock and the camera. The processor is configured to determine a distance between the target object and the TOF system based on the measured time, identify a reflectance of the target object based on the return energy of the emitted light signal, and determine an exposure level based on the distance to the target object and the reflectance of the target object.

Another aspect of the subject matter described in the disclosure provides a method for capturing an image. The method includes emitting a light signal via a time-of-flight (TOF) system and sensing a reflection of the emitted light signal off of a target object via the TOF system. The method further includes determining a return energy based on the reflection of the emitted light signal and measuring a time between when the light signal is emitted and when the emitted light signal is sensed. The method also includes determining a distance between the target object and the TOF system based on the measured time, identifying a reflectance of the target object based on the return energy of the emitted light signal, and determining an exposure level based on the distance to the target object and the reflectance of the target object.

An additional aspect of the subject matter described in the disclosure provides an additional apparatus for capturing a scene. The imaging apparatus comprises means for identifying a time-of-flight (TOF) of a light signal, comprising means for emitting the light signal, means for sensing a reflection of the emitted light signal off of a target object, and means for determining a return energy based on the reflection of the emitted light signal. The apparatus further includes means for measuring a time between when the light signal is emitted and when the emitted light signal is sensed and means for determining a distance between the target object and the TOF system based on the measured time. The apparatus also includes means for identifying a reflectance of the target object based on the return energy of the emitted light signal and means for determining an exposure level based on the distance to the target object and the reflectance of the target object.

Another aspect of the subject matter disclosed in the disclosure provides a computer program product comprising a computer readable storage medium encoded thereon with instructions that when executed cause an apparatus to perform a method of capturing an image. The method comprising generating and emitting a light signal via a time-of-flight (TOF) system and sensing a reflection of the emitted light signal off of a target object via the TOF system. The method further includes determining a return energy based on the reflection of the emitted light signal and measuring a time between when the light signal is emitted and when the emitted light signal is sensed. The method also includes determining a distance between the target object and the TOF system based on the measured time, identifying a reflectance of the target object based on the return energy of the emitted light signal, and determining an exposure level based on the distance to the target object and the reflectance of the target object.

BRIEF DESCRIPTION OF THE DRAWINGS

The above-mentioned aspects, as well as other features, aspects, and advantages of the present technology will now be described in connection with various embodiments, with reference to the accompanying drawings. The illustrated embodiments, however, are merely examples and are not intended to be limiting. Throughout the drawings, similar symbols typically identify similar components, unless context dictates otherwise. Note that the relative dimensions of the following figures may not be drawn to scale.

DETAILED DESCRIPTION

Figure 1A:
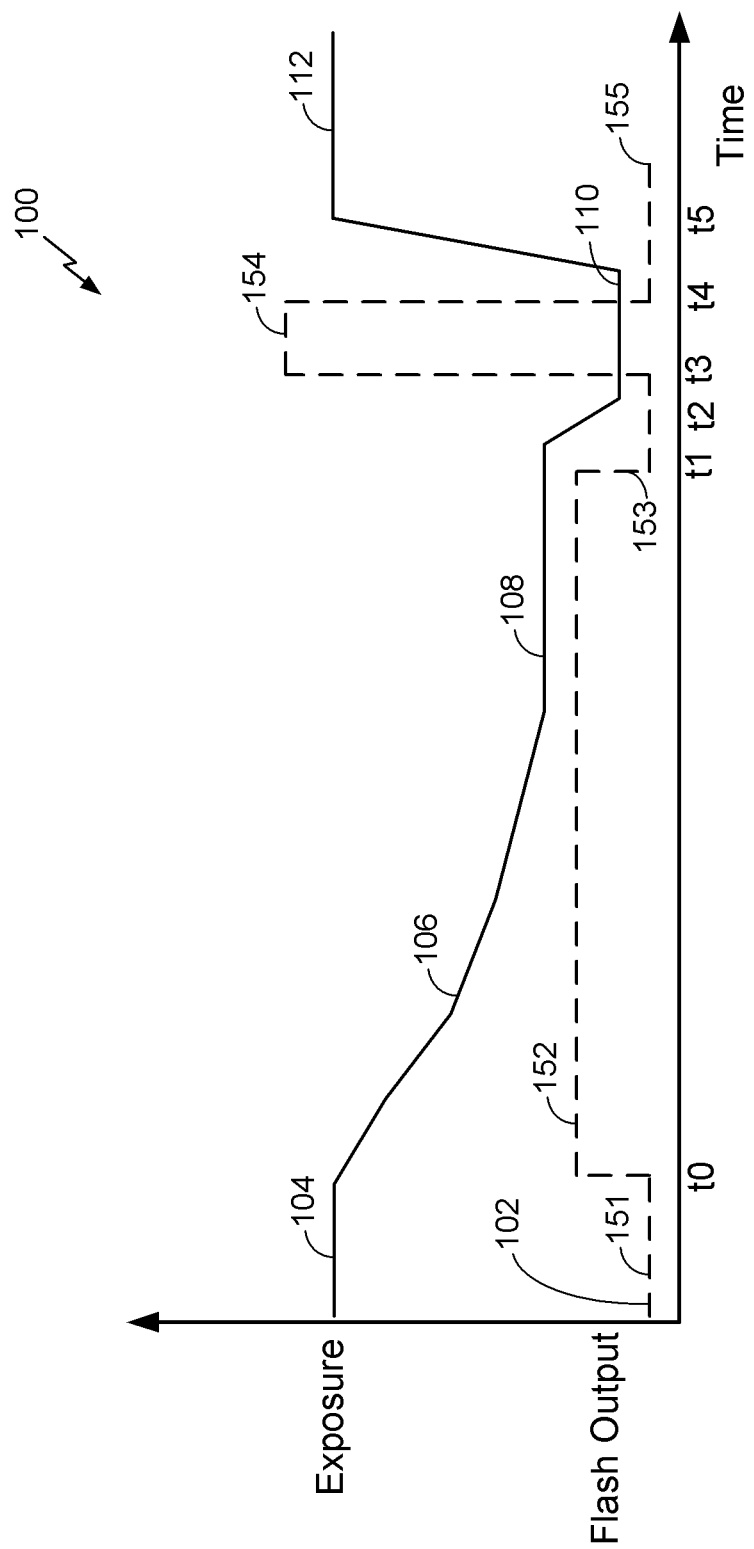
FIG. 1A illustrates an example of a timing diagram of an automatic exposure control system in accordance with some embodiments.

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure may be thorough and complete, and may fully convey the scope of the disclosure to those skilled in the art. The scope of the disclosure is intended to cover aspects of the systems, apparatuses, and methods disclosed herein, whether implemented independently of, or combined with, any other aspect of the invention. For example, an apparatus may be implemented or a method may be practiced using any number of the aspects set forth herein. In addition, the scope of embodiments of the invention, including those described herein, is intended to cover such an apparatus or method which is practiced using other structure, functionality, or structure and functionality in addition to or other than the various aspects of the embodiments set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to various imaging and photographic technologies, system configurations, computational systems, flash systems, and exposure determination systems. The Detailed Description and drawings are intended to be illustrative of the disclosure of embodiments of the invention, rather than limiting.

In photography, when a user is using an imaging system (or camera) in a manual mode the user can actively control what the imaging system is focused on and may select various characteristics (e.g., aperture, shutter speed, "film" speed) that control the exposure. This allows the imaging system to capture an image nearly instantaneously when the user activates a control interface to capture an image. However, when an imaging system is used in an automatic focus ("autofocus") and an automatic exposure mode, before an image is captured the imaging system is configured to determine a correct exposure and perform an autofocus process. Automatically determining the exposure for an image that will be captured using a flash may involve combining information determined from a no-flash exposure of a target object (or scene, herein used interchangeably with "target object" unless indicated otherwise) with information determined from a pre-flash exposure of the target object, before the actual image is captured. Accordingly, an automatic exposure process takes time to perform and results in a delay of capturing an image.

A "no-flash period" is a broad phrase that is used herein to generally refer to a period of time when an imaging system may determine and set an exposure level based on the brightness of the target object with only ambient illumination (for example, sunlight or other light that is not from the imaging system flash). During the no-flash period, a flash of the imaging system does not illuminate the scene and may be in a standby mode or off. The no-flash period may exist any time that the imaging system is active but has not been activated to capture an image.

A "pre-flash period" is a broad phrase that is used herein to generally refer to a period of time during which an imaging system may activate a flash at a level of power that is less than full power to determine and set exposure parameters of the imaging system. In some embodiments, the flash produces illumination of a target object at two or more illumination levels. However, because this process may not be performed until the user activates the imaging system to capture the image, the time required for the imaging system to perform the pre-flash exposure delays the capture of the image. Additionally, because a flash is often of limited power, a target object at a far distance (for example, 8-15+ meters) from the imaging system may not be adequately illuminated during a pre-flash period. This may cause the imaging system to generate an improper flash exposure or take an extended period of time to determine the exposure.

One exemplary solution for expediting the capture of the desired image may include utilizing alternate or additional sensors for determining the exposure of the imaging system, for example sensors configured to determine distance and reflectance of the target object.

FIG. 1A illustrates a graphical representation of an example of a timing diagram 100 for an automatic exposure control (AEC) system. The timing diagram 100 shows an example of an exposure level of a sensor and a flash output level for an imaging system capturing an image when a flash is used. In the timing diagram 100, time increases along the x-axis from left to right. A relative flash output power (of the emitted light) associated with the imaging system increases along the y-axis, that is, a low flash output level near zero of the y-axis to a higher flash output level increasing along the y-axis. The timing diagram 100 also indicates a relative amount of exposure, increasing along the y-axis, that is, a low amount of exposure near zero of the y-axis to a higher amount of exposure increasing along the y-axis. The flash line 102 indicates the level of the light being emitted by a flash of the imaging system (referred to in this example as a camera), while the exposure line 104 indicates the exposure as determined and set by an AEC process or system of the imaging system. The timing diagram 100 further includes specific points in time along the x-axis.

As illustrated in FIG. 1A, the flash line 102 starts at or near the no-flash period 151 of zero, indicating a flash is not emitting light, for example when the camera is off or when the camera is just being used to view a scene but has not yet been instructed to capture an image. During this period (along the x-axis prior to the time t0), the exposure line 104 is at a no-flash exposure level, indicting an exposure setting of the camera that may be higher than at times when the camera is using the flash. At a time prior to t0, the camera may identify a no-flash exposure, for example, the level of brightness of the target object and the level of natural light in the scene and/or the environment without the flash from the camera. The camera is configured with an AEC process that can be used to determine exposure.

At time t0, the flash line 102 increases to a constant, pre-flash illumination level during a pre-flash period 152. The pre-flash level may be when the flash is charged to a power level that is lower than its full power level, or controlled to only emit light at a level that is lower than light it emits at its full power level. In some embodiments, the pre-flash level may be a constant illumination level or a varying illumination level that does not increase beyond a given threshold of illumination. As shown in the timing diagram 100, the pre-flash level of the depicted embodiment is maintained at the constant illumination level during the pre-flash period 152. During this pre-flash period, the AEC process may adjust the exposure for the target object based on the brightness of the target object as illuminated by the pre-flash, as indicated by the exposure line 104 decreasing at section 106 until it reaches an exposure level 108. At time t1, the pre-flash period ends, as indicated by the flash line 102 decreasing back to a low level 153 near or at a zero value.

The time a camera spends adjusting the exposure during the pre-flash period may be affected by, for example, one or more of the brightness of the environment, the distance of the target object from the camera, and the reflectance of the target object. For example, the time to determine exposure may be less when the target object is far from the camera or when the target object has a low reflectance because the light from the flash of the camera would not greatly increase the brightness of the target object due to the distance and/or the low reflectance of the target object, so a proper flash exposure is not necessary to determine.

At time t2, while the flash line 102 has decreased back to near or at the zero value, the AEC process adjusts the exposure to the estimated flash exposure level 110. The estimated flash exposure level 110 may be calculated using a no-flash exposure (prior to t0) of the target object and the measured and adjusted exposures identified during the pre-flash period (between t0 and t1). The AEC process may calculate the frame brightness of the illuminated frame during the pre-flash period using information collected from one or more images collected during the pre-flash period. The AEC process may further calculate the brightness of the target object as it would be illuminated during the main flash, which utilizes the flash illuminated during the pre-flash period, but at a higher power level, thus identifying the exposure of the camera for capturing an image. The brightness of the target object may be used to determine the proper exposure to capture an image with the main flash, and the AEC process can set the exposure to the estimated flash exposure level 110 at time t2.

At time t3, the main flash is activated at the higher power level during the main flash period 154 for a period of time, that is, until time t4, during which an image is captured. At t5, after the image is captured, the AEC process may reset the exposure of the camera to the no-flash exposure setting 115 and the flash may be turned off to the near zero level during a no-flash period 155.

With the above described process, the adjustment and calculation of the exposure necessary for the desired target object may take as many as fifteen (15) or more frames. In many embodiments, the entire process may take half a second or more. As may be seen in timing diagram 100, a majority of time may be spent waiting for the exposure of the camera to be adjusted during the pre-flash period. Accordingly, capturing an image using the AEC process described above may introduce significant latencies into the process of capturing an image of the target object.

Figure 1B:
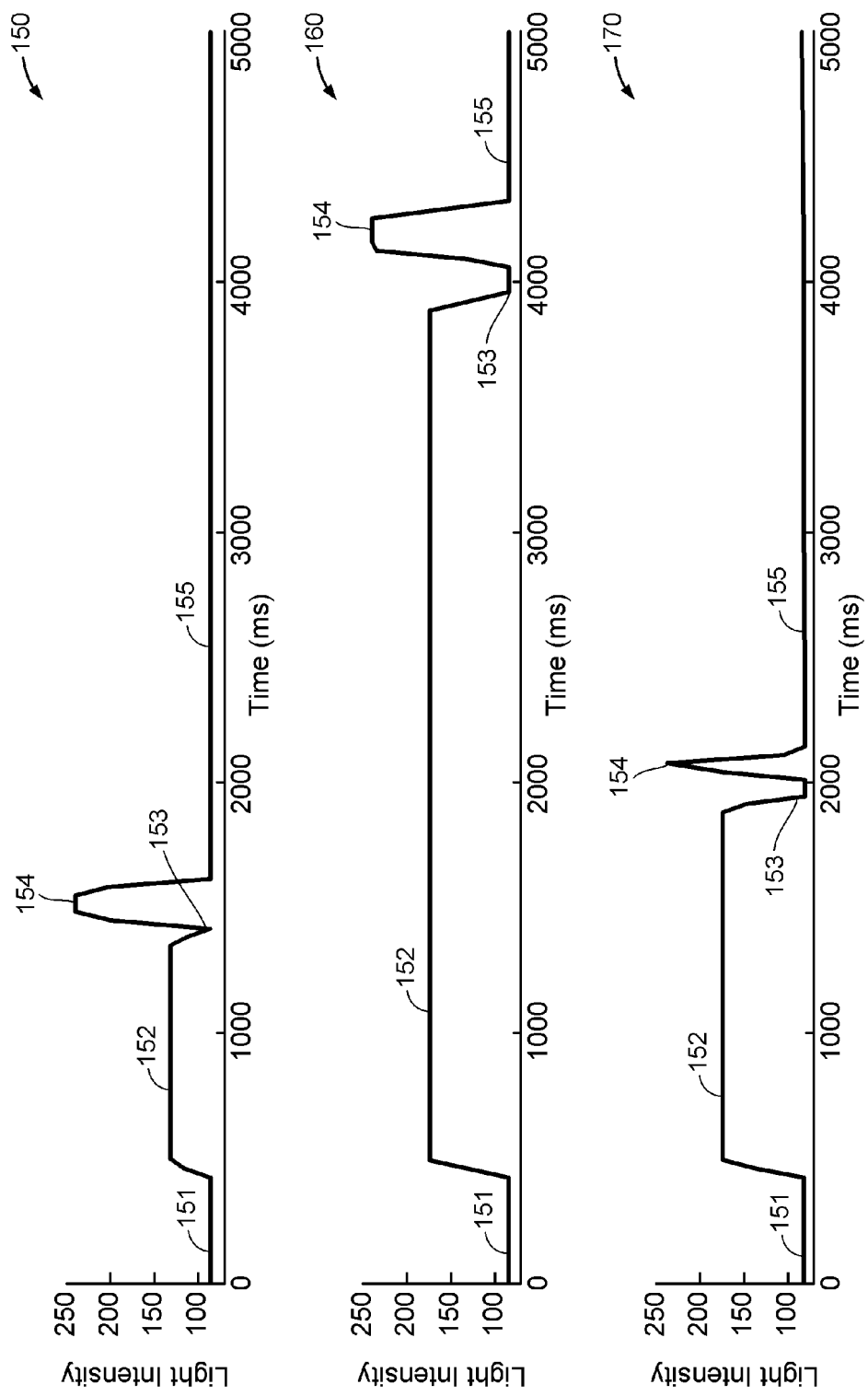
FIG. 1B illustrates three examples of timing diagrams of automatic exposure control systems in accordance with three exemplary implementations.

Various processes may be used to determine the correct exposure using a pre-flash process, each causing a delay in the time between when a camera receives a user command to take a picture and when the picture is actually taken. FIG. 1B shows three examples flash timing diagrams (graphs) which may be used in a camera, and illustrates potential delays that are caused by AEC systems and exposure adjustment schemes. The three graphs (timing diagrams similar to that in FIGS. 1) 150, 160 and 170, respectively, are illustrated with "time" increasing along the x-axis from left to right and "light intensity" increasing along the y-axis from bottom to top. The timing diagrams 150, 16, and 170 shown include labels corresponding to the flash timing diagram of FIG. 1A, such that similar periods from FIG. 1A are shown in the timing diagrams of FIG. 1B. For example, each timing diagram 150, 160 and 170 has a no-flash period 151, a pre-flash period 152, a main flash period 154, and another no-flash period 155 after the main flash period 154. These examples illustrate significant delays in an imaging process. For the example illustrated in timing diagram 150, the total time to perform a pre-flash exposure determination process is about 1.2 seconds. For timing diagram 160, the total time is about 4 seconds. For timing diagram 170, the total time is about 1.8 seconds.

In some embodiments, the autofocus system may rely on similar timing issues of the AEC system described above. Accordingly, the autofocus system may suffer from many deficiencies described above. For example, if the environment is too dark or lowly lit, the autofocus system may not work properly because the environment is too dark. Accordingly, the autofocus system may use the flash of the camera to assist in the focusing of the camera, which may be slow and cause delays in the time from when the camera is commanded to capture an image to the time when the camera actually captures the image, similar to delays described above in relation to the exposure. Autofocus may be further slowed depending on the initial lens position and the type of focusing algorithm used to focus the camera.

Imaging systems may incorporate laser sensors and/or time-of-flight (TOF) systems. These TOF systems may be used to assist the exposure and focusing of the cameras, and significantly reduce the exposure determination process. In various embodiments, TOF systems may be used to: measure distance, measure returned or reflected energy, and/or identify signal-to-noise ratios. The TOF systems can include a light emitter and a light sensor. The light emitter may be configured to emit light, while the light sensor system may be configured to sense a portion of the emitted light that reflects off of the target object and returns to the light sensor. The time it takes for light emitted from the light emitter and to reflect from a target object to the light sensor can be used to identify the distance of the target object from the TOF system. A TOF system can also be configured to determine the amount of energy of the sensed light (reflected off of the target object) and this may be used to determine reflectance of the target object and exposure information. In some embodiments, the phase difference of the emitted light and the sensed light may be used to determine the distance.

Figure 2:
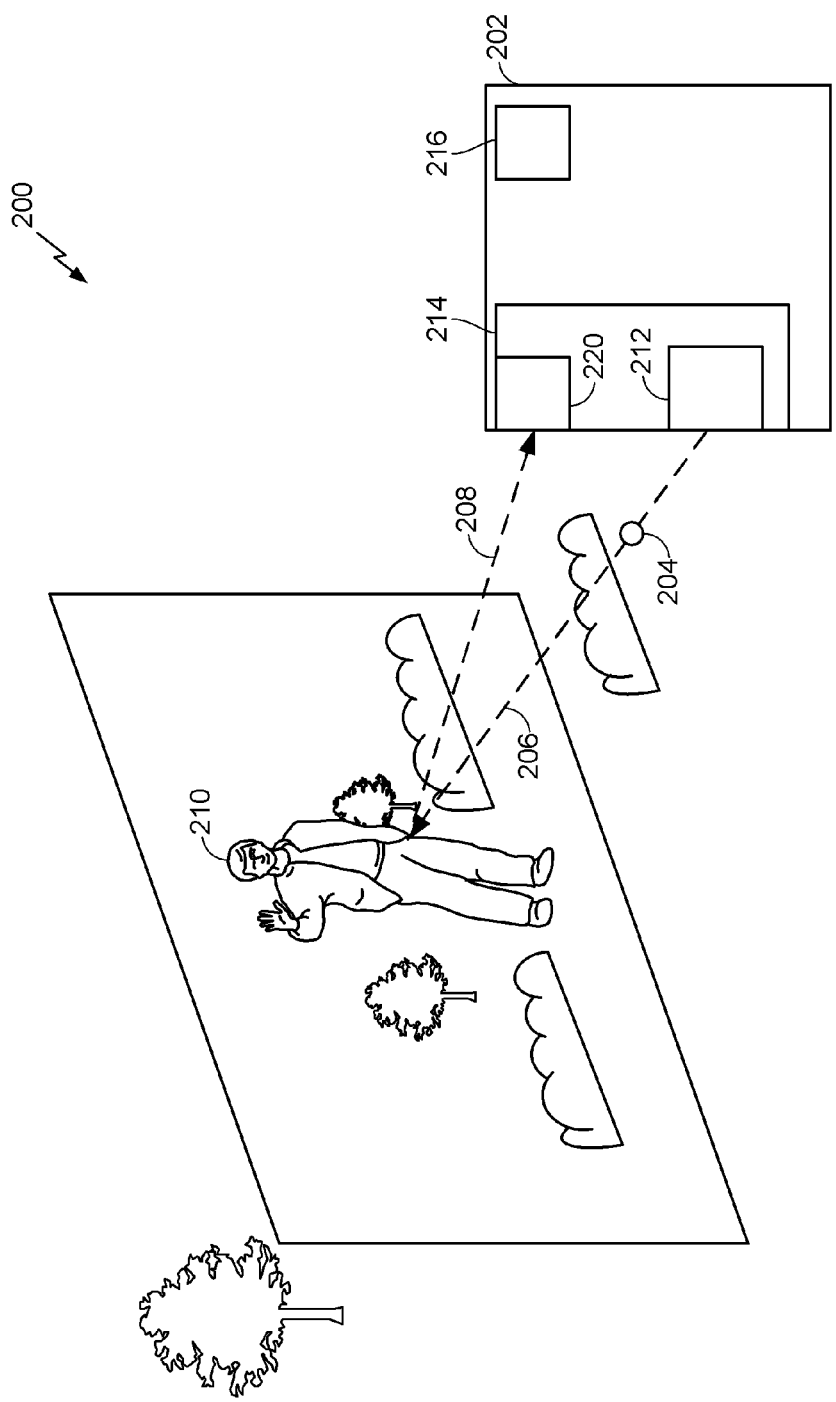
FIG. 2 is a diagram illustrating using a sensor (e.g., a camera) to identify a distance to a target object and a reflectance of the target object, in accordance with an exemplary implementation.

FIG. 2 is a diagram illustrating an example of an image capture device 202, according to some embodiments of the invention. In this example, the image capture device 202 is a camera that includes a time of flight (TOF) system 214, though the image capture device 202 may be any device capable of capturing a still or moving image, regardless of format (digital, film, etc.) or type (video camera, still camera, web camera, etc.). The image capture device 202 is configured to determine a distance to a target scene or a target object, and to determine exposure (e.g., at least one exposure parameter) of a target scene or a target object using the TOF system 214. For clarity of description, both a target scene and a target object will be referred to as a "target object" in the context of being the subject matter that the camera is focused on. An exposure parameter may be any of various parameters that can determine an exposure or affect the exposure. An example of an exposure parameter is a parameter indicative of an aperture or entrance pupil through which light propagating through a lens towards a sensor passes through (for example, an f/# or physical aperture size). Another example of an exposure parameter is a duration of time a shutter of the camera is open to let light pass to a sensor of the camera (which may be referred to as the "shutter speed"). Another example of an exposure parameter is a parameter for controlling the operation of a sensor of the camera to sense light and capture an image, for example, the "film speed"—a term a person of ordinary skill in the art will understand is a setting that affects the sensitivity of the sensor (a carry-over term from film photography, each film having its sensitivity rated on a relative scale as indicated by its ISO). Another example of an exposure parameter is a parameter indicative of ambient light being reflected by the target object, and which may be used to determine the exposure used to capture an image of the target object. Another example of an exposure parameter is a parameter indicative of light from a light source reflected by the target object. For example, the light (from a light source) may be light produced by a light emitter 212 of the TOF system 214. The light emitter 212 of the TOF system may be incorporated in the image capture device 202 or coupled to the image capture device 202. In some embodiments, the light emitter 212 is separate from the image capture device 202, that is, it is not incorporated into or structurally attached to the image capture device 202.

The embodiment of FIG. 2 illustrates emitted light 204 from a light emitter 212 propagating along a light path 206 that represents the path of light from the light emitter 212 to a target object 210. FIG. 2 also illustrates a reflected light 208 which may represent the light or the reflected path of the light that illuminates the target object 210 (for example, from light emitter 212) and reflects from the target object 210 to a light sensor 220 of the TOF system 214. In some embodiments, the image capture device 202 may include a clock, a timer, or some other means for determining the amount of time between when the emitted light 204 is emitted from the light emitter 212 to illuminate the target object 210 and when the emitted light 204 reflected from the target object 210 is sensed by the light sensor 220. In some embodiments, the light emitter 212 and the light sensor 220 may be two components that are configured to operate together, instead of being part of a single component TOF system 214. While the light emitter 212 and the light sensor 220 may be two distinct components and/or systems, for the purposes of this disclosure, they will be discussed as forming a TOF system 214. In some embodiments, the TOF system 214 may be an integrated TOF system, where the light emitter 212 and the light sensor 220 are part of a single integrated system.

In an example of its operation, the light emitter 212 may emit a pulsed infrared (IR) light. This emitted light 204, which can be characterized (and referred herein) as a light signal(s) or as including a plurality of photons, illuminates the target object 210 and reflects from the target object to the light sensor 220. A clock or timer of the TOF system 214, or another component of the image capture device 202, may determine the time it takes between emitting the emitted light 204 and sensing the reflected light 208 at the light sensor 220. Using this amount of time and the known speed of light, a distance that light travels from the light emitter 212 to the target object 210 and back to the light sensor 220 may be calculated using Equation 1.

$$\text{Distance traveled} = (\text{Light Travel Time}) \times (\text{Speed of Light}) \qquad (1)$$

The distance to the target object is half of the distance traveled. Accordingly, a target object 210 that is at a location farther away from the camera, compared to target objects that are closer to the camera, will require more time for the emitted light 204 to travel from the light emitter 212 to the target object 210 and back to the light sensor 220.

The TOF system 214 may be configured to identify a returned energy from the target object. The returned energy identifies the amount of energy the emitted light has after reflecting off the target object. The greater the amount of energy of the emitted light when sensed by the light sensor of the TOF system 214 after reflecting off the target object, the higher the reflectance of the target object. Target object reflectance may be directly associated with how bright or dark a target object appears. Accordingly, for a given light condition and distance, the lower the amount of energy of the light when sensed at the light sensor 220, the darker the appearance of a target object.

The TOF system may be configured to generate a signal to noise (Signal-to-Noise ratio or SNR) that indicates the strength of the return signal (light) at the TOF system after the return signal reflects off the target object. For example, when the return signal received is strong (in relation to background noise or noise introduced by the environment), the SNR is higher. Alternatively, if the return signal received is weaker (in relation to the background noise), then the SNR may be lower. With regards to the reflection of the return signal of the target object, a higher SNR may indicate that the target object has a higher reflectance (e.g., that the target object may be of a color or material that reflects light), while a lower SNR indicate that the target object has a lower reflectance (e.g., that the target object may be of a color or material that absorbs more light). The discussion above may apply to scenarios when the SNR is measured when the reflection is received from the target object at the same distance. However, the SNR may also vary dependent upon the distance of the target object from the TOF system. Accordingly, the same target object may generate different SNR values based on the distance of the target object from the TOF system. As the target object moves further from the TOF system (e.g., the distance gets larger), the SNR will become lower.

Figure 3:
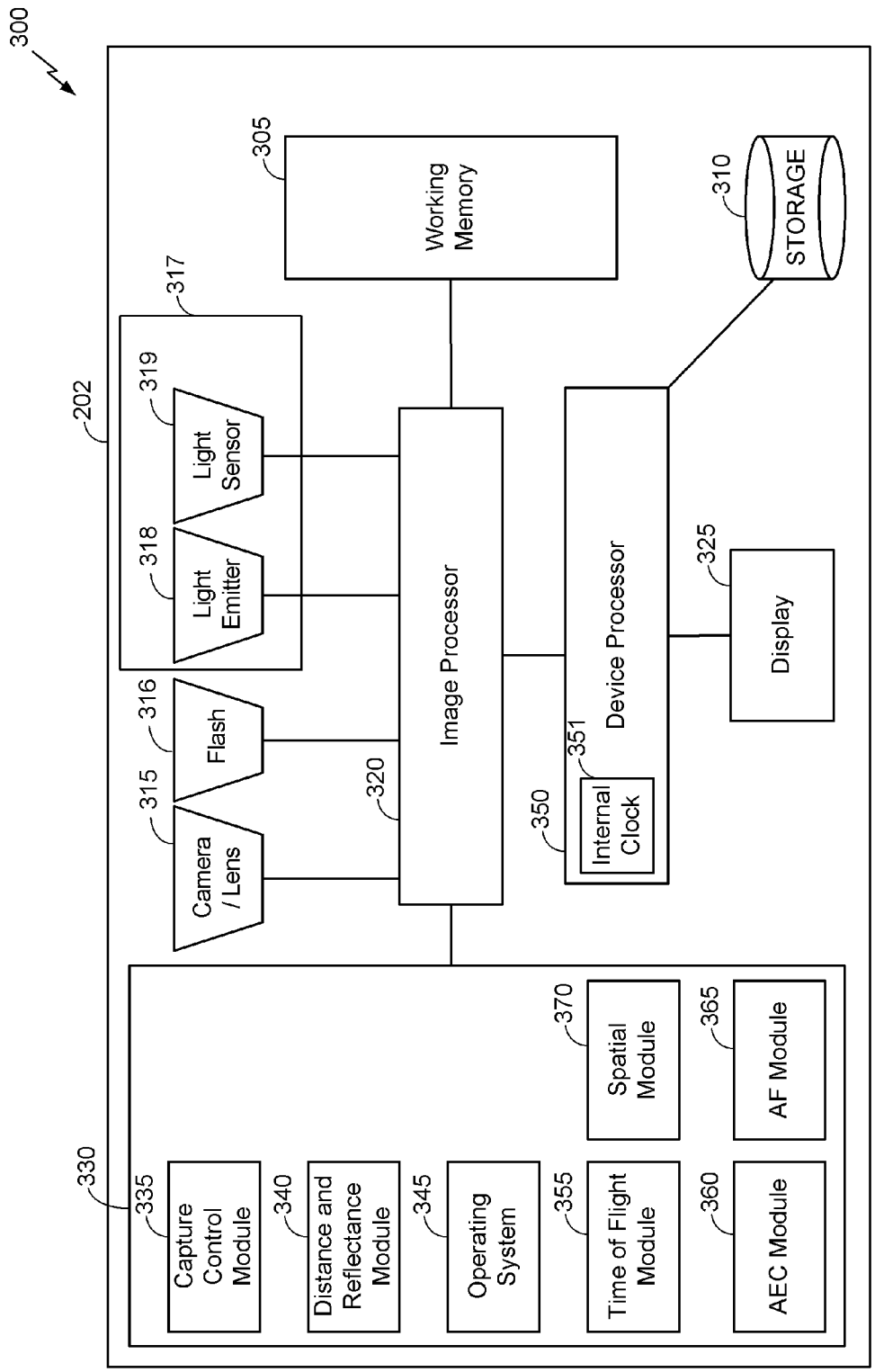
FIG. 3 is a block diagram illustrating an example of one embodiment of an image capture device for determining automatic exposure correction and autofocusing.

FIG. 3 illustrates a high-level block diagram of one embodiment of an image capture device 302 (similar to the image capture device 202 of FIG. 2) having a set of components including an image processor 320 linked to a camera 315, to a flash (or other light source) 316, to a TOF system 317, and to modules for determining automatic exposure correction (AEC module 360 and auto-focus (AF) module 365). The image processor 320 may also be in communication with a working memory 305, a memory 330, and a device processor 350, which in turn may be in communication with electronic storage module 310, a display 325 (for example an electronic or touchscreen display), and a distance/reflectance module 340. In some embodiments, a single processor may comprise both the image processor 320 and the device processor 350 instead of two separate processors as illustrated in FIG. 3. In some embodiments, one or both of the image processor 320 and the device processor 350 may comprise a clock 351, shown in FIG. 3 as integrated within the device processor 350. Some embodiments may include three or more processors. In some embodiments, some of the components described above may not be included in the image capture device 302 or additional components not described above may be included in the image capture device 302. In some embodiments, one or more of the components described above or described as being included in the image capture device 302 may be combined or integrated into any other component of the image capture device 302.

The image capture device 302 may be, or may be part of, a cell phone, digital camera, tablet computer, personal digital assistant, laptop computer, personal camera, action camera, mounted camera, connected camera, wearable device, automobile, drone, or the like. The image capture device 302 may also be a stationary computing device or any device in which the TOF system 317 would be advantageous. A plurality of applications may be available to the user on the image capture device 302. These applications may include traditional photographic and video applications, high dynamic range imaging, panoramic photo and video, or stereoscopic imaging such as 3D images or 3D video.

Still referring to FIG. 3, the image capture device 302 includes the camera/lens ("camera") 315 for capturing images of target objects and/or scenes. The camera 315 may include at least one sensor, at least one optical imaging component that focuses light received from the field of view (FOV) of the image capture device 302 (for example, the FOV of the camera 315) to the at least one sensor (for example, a CMOS or CCD sensor), the AF module 365 coupled to the at least one optical imaging component, and the AEC module 360 coupled to the at least one optical imaging component. In some embodiments, the image capture device 302 may include more than one camera. The camera 315 may be coupled to the image processor 320 to transmit a captured image to the image processor 320. In this embodiment, signals to and from the camera 315 are communicated through the image processor 320.

The image capture device may include the flash 316. In some embodiments, the image capture device 302 may include at least two flashes. The flash 316 may include, for example, a flash bulb, a reflector, a geometric light pattern generator, or an LED flash. The image processor 320 can be configured to receive and transmit signals from the flash 316 to control the flash.

The image processor 320 may be further coupled to the TOF system 317. In some embodiments, the TOF system 317 may include two components, as described above. In some embodiments, the TOF system 317 may include a light emitter 318 and a light sensor 319. The light emitter 318 may be configured to emit radiation (for example, light) from the TOF system 317. For ease of description, any radiation emitted from the TOF system 317 will be referred to as "light" including visible and non-visible radiation. The light is directed at the target object of the image capture device 302. The light sensor 319 is configured to sense light emitted by the light emitter 318 after the light has reflected from an object. In some embodiments, the light sensor 319 may be configured to sense light reflected from multiple target objects of a scene.

As illustrated in FIG. 3, the image processor 320 is connected to the memory 330 and the working memory 305. In the illustrated embodiment, the memory 330 may be configured to store the capture control module 335, the distance/reflectance module 340, the operating system 345, the time-of-flight (TOF) module 355, the AEC module 360, and the AF module 365. Additional modules may be included in some embodiments, or fewer modules may be included in some embodiments. These modules may include instructions that configure the image processor 320 to perform various image processing and device management tasks. The working memory 305 may be used by the image processor 320 to store a working set of processor instructions or functions contained in one or more of the modules of the memory 330. The working memory 305 may be used by the image processor 320 to store dynamic data created during the operation of the image capture device 302 (e.g., one or more target object distance measurements or FOV distance measurement arrays, the reflectance of one or more target objects or FOV reflectance measurement arrays, exposure estimates, focus estimates, etc.). While additional modules or connections to external devices or hardware may not be shown in this figure, they may exist to provide other exposure and focus adjustment and estimation options or actions.

As mentioned above, the image processor 320 may be configured by or may be configured to operate in conjunction with several modules stored in the memory 330. The capture control module 335 may include instructions that control the overall image capture functions of the image capture device 302. For example, the capture control module 335 may include instructions that configure the image processor 320 to capture raw image data of the target object using the camera 315. The capture control module 335 may also be configured to activate the flash 316 when capturing the raw image data. In some embodiments, the capture control module 335 may be configured to store the captured raw image data in the electronic storage module 310 or to display the captured raw image data on the display 325. In some embodiments, the capture control module 335 may direct the captured raw image data to be stored in the working memory 305. In some embodiments, the capture control module 335 may call one or more of the other modules in the memory 330, for example the distance/reflectance module 340, the TOF module 355, the AEC module 360, or the AF module 365.

The distance/reflectance module 340 may comprise instructions that allow the image processor 320 or the device processor 350 to calculate, estimate, or otherwise determine the distance to and reflectance of the target object or FOV of the image capture device 302. The distance/reflectance module 340 may include instructions for using the TOF system 317, the camera 315, and the clock 351 to identify the distance of the target object. When identifying the distance to and reflectance of the target object, the distance/reflectance module 340 may be configured to determine the distance to the target object. Accordingly, the distance/reflectance module 340 may comprise the instructions to emit a light signal via the light emitter 318 and sense a reflection of the light signal off the target object via the light sensor 319. The instructions may further instruct the clock 351 to measure the time between the emission of the light signal and the sensing of the reflection of the light signal. Based on the amount of time that elapses between when the light signal is emitted by the light emitter 318 and when the light signal reflection is sensed by the light sensor 319, the distance/reflectance module 340 may comprise instructions to determine the distance the light signal traveled, for example using Equation 1 above. The distance/reflectance module 340 may further comprise instructions for determining the distances of multiple points in the FOV of the image capture device 302 and for forming an array of the distances. The instructions contained therein may include identifying distances (as described above for the target object) for each of a plurality of points or positions within the FOV of the image capture device 302 an storing the array in one of the working memory 305 or the electronic storage module 310, for example.

Additionally, the distance/reflectance module 340 may comprise instructions for determining the reflectance of the target object or an array of points within the FOV of the image capture device 302. As described above in relation to the distance instructions, the distance/reflectance module 340 may further comprise instructions for emitting the light signal via the light emitter 318 of the TOF system 317 and sensing the reflected light signal via the light sensor 319. Based on the energy of the light reflected off of the target object, the distance/reflectance module 340 may identify the reflectance of the target object. Additionally, the instructions contained therein may direct the distance/reflectance module 340 to identify the reflectance of each of a plurality of point or locations within the FOV of the image capture device 302, and may provide for the storage or display of the identified reflectance values.

In some embodiments, the distance/reflectance module 340 may further comprise instructions for generating the offline configuration data described below in reference to FIG. 5B.

The AEC module 360 may comprise instructions that allow the image processor 320 or the device processor 350 to calculate, estimate, or adjust the exposure of the camera 315 and thus of the image capture device 302. The AEC module 360 may include the instructions allowing for the exposure estimations described above in reference to FIG. 1 and below in reference to FIGS. 5A and 5B. Accordingly, the AEC module 360 may comprise instructions for utilizing the TOF system 317 (including both the light emitter 318 and the light sensor 319), the camera 315, the clock 351, and the flash 316 to identify and/or estimate the no-flash exposure, the pre-flash exposure, and the flash exposure. Additionally, the AEC module 360 may include instructions for adjusting the exposure of the camera 315 to at least one of the no-flash exposure, the pre-flash exposure, and the flash exposure. In some embodiments, the AEC module may further comprise instructions for illuminating the flash at one of the no-flash, pre-flash, and main flash levels of illumination.

As the brightness of the target object as captured by the image capture device 302 is directly related to the exposure of the image capture device 302, the no-flash exposure of the image capture device 302 may be identified at any time when the flash is not illuminated but the image capture device 302 is turned on. Accordingly, in some embodiments, the AEC module 360 may be configured to constantly monitor the exposure of the image capture device 302 based on the brightness of the target object. The AEC module 360 may be integrated or otherwise communicate with one or more of the capture control module 335 and the operating system 345, and instead capture an image according to the methodology described above. However, as described above, the use of the flash 316 with the AEC module 360 may introduce unnecessary delays in the capture of an image.

Alternatively, the TOF system 317 may provide depth and SNR information for different portions of the FOV instead of just a single point. The AF module 365 and the AEC module 360 may utilize this information from the TOF system 317 and employ certain strategies and methods to achieve optimal exposure and focus for target objects at various locations in the FOV. For example, if a portrait of a person was taken, and the person was not standing at the center of the image but rather off-center, such as at the left third of the FOV, the TOF system 317 may accurately detect the person's location, (assuming the person is the closest object to the camera). Accordingly, the AF module 365 and the AEC module 360 may choose to focus and expose on the nearest object, in this case the person.

Still referring to FIG. 3, the operating system 345 may configure the image processor 320 to manage the working memory 305 and the processing resources of image capture device 302. For example, the operating system 345 may include device drivers to manage hardware resources such as the camera 315, the flash 316, and the TOF system 317. Therefore, in some embodiments, instructions contained in the processing modules discussed above and below may not interact with these hardware resources directly, but instead interact with this hardware through standard subroutines or APIs located in the operating system 345. Instructions within the operating system 345 may then interact directly with these hardware components. The operating system 345 may further configure the image processor 320 to share information with device processor 350. The operating system 345 may also include instructions allowing for the sharing of information and resources between the various processing modules of the image capture device.

The AF module 365 can include instructions that configure the image processor 320 to adjust the focus position of the camera 315. The AF module 365 can include instructions that configure the image processor 320 to perform focus analyses and automatically determine focus parameters in some embodiments, and can include instructions that configure the image processor 320 to respond to user-input focus commands in some embodiments. In some embodiments, the AF module 365 may use information from the light emitter 318 and the light sensor 319 to determine when the target object (or one or more points or positions within the FOV of the image capture device) is at a specific distance and appropriate focus. In some embodiments, the AF module 365 may include instructions for identifying and adjusting the focus of the camera 315 based on light emitted from the flash 316 and received at the light sensor 319 from the target object or one or more points or positions within the FOV. In some embodiments, the AF module 365 may be configured to receive a command from the capture control module 335, the distance/reflectance module 340, the AEC module 360, the TOF module 355, or from one of the image processor 320 or device processor 350.

The AF module 365 may be configured to perform a search algorithm only during the pre-flash period and may not perform any functions during the no-flash period. Accordingly, if information from the TOF system 317 is provided to the AF module 365, an amount of time taken by the AF module 365 to perform the auto-focusing functions can be reduced.

In FIG. 3, the device processor 350 may be configured to control the display 325 to display the captured image, or a preview of the captured image including estimated exposure and focus settings, to a user. The display 325 may be external to the image capture device 302 or may be part of the image capture device 302. The display 325 may also be configured to provide a viewfinder displaying the preview image for the user prior to capture the image of the target object, or may be configured to display a captured image stored in the working memory 305 or the electronic storage module 310 or recently captured by the user. The display 325 may include a panel display, for example, a LCD screen, LED screen, or other display technologies, and may implement touch sensitive technologies. The device processor 350 may also be configured to receive an input from the user. For example, the display 325 may also be configured to be a touchscreen, and thus may be configured to receive an input from the user. The user may use the display 325 to input information that the processor may provide to the distance/reflectance module 340 or the TOF module 355 or the AEC module 360 or the AF module 365. For example, the user may use the touchscreen to select the target object from the FOV shown on the display 325 or set or establish the exposure levels and focus settings of the image capture device 302. The device processor 350 may receive that input and provide it to the appropriate module, which may use the input to select perform instructions enclosed therein (for example determine the distance or reflectance of the target image at the distance/reflectance module 340, determine the focus of the target image at the AF module 365, etc.).

In some embodiments, the device processor 350 may be configured to control the one or more of the processing modules in the memory 330 or to receive inputs from one or more of the processing modules in the memory 330. The TOF module 355 may be configured to interact with the TOF system 317. The TOF module 355 may comprise instructions for applying Equations 1 and 2, as described herein, to determine various parameters and values based on measurements and actions performed by the TOF system 317. For example, the TOF module 355 may include the equations for determining a distance traveled by the signal emitted by the light emitter 318 or including software for interacting with and/or controlling the TOF system 317 and the light emitter 318 and the light sensor 319. In some embodiments, the TOF module 355 may be configured to store or acquire the offline configuration information described below. In some embodiments, the device processor 350 or the TOF module 355 may select multiple equations for use with the TOF system 317 and may determine to use one or more of the equations to identify a desired parameter based on the emitted and sensed light signals.

The device processor 350 may write data to the electronic storage module 310, for example data representing captured images. While the electronic storage module 310 is represented graphically as a traditional disk device, in some embodiments, the electronic storage module 310 may be configured as any storage media device. For example, the electronic storage module 310 may include a disk drive, such as a floppy disk drive, hard disk drive, optical disk drive or magneto-optical disk drive, or a solid state memory such as a FLASH memory, RAM, ROM, and/or EEPROM. The electronic storage module 310 can also include multiple memory units, and any one of the memory units may be configured to be within the image capture device 302, or may be external to the image capture device 302. For example, the electronic storage module 310 may include a ROM memory containing system program instructions stored within the image capture device 302. The electronic storage module 310 may also include memory cards or high speed memories configured to store captured images which may be removable from the camera.

Although FIG. 3 depicts a device 300 having separate components to include a processor, imaging sensor, and memory, in some embodiments these separate components may be combined in a variety of ways to achieve particular design objectives. For example, in an alternative embodiment, the memory components may be combined with processor components to save cost and improve performance.

Additionally, although FIG. 3 illustrates a number of memory components, including the memory 330 comprising several processing modules and a separate memory comprising a working memory 305, in some embodiments, different memory architectures may be utilized. For example, a design may utilize ROM or static RAM memory for the storage of processor instructions implementing the modules contained in memory 330. The processor instructions may be loaded into RAM to facilitate execution by the image processor 320. For example, working memory 305 may comprise RAM memory, with instructions loaded into working memory 305 before execution by the image processor 320. In some embodiments, one or more of the processing modules may be software stored in the memory 330 or may comprise a hardware system combined with the software components. Furthermore, functions associated above with one of the image processor 320 and the device processor 350 may be performed by the other of the image processor 320 and the device processor 350 or both the image processor 320 and the device processor 350, though not described as such above.

In some embodiments, the image processor 320 may be further configured to participate in one or more processing operations prior to capturing an image, while capturing an image, and after capturing an image. For example, prior to capturing the image, the image processor 320 may be configured to perform one or more of the processes described above (e.g., estimating and adjusting the exposure and the focus of the camera 315). In some embodiments, the image processor 320 may be configured to, in conjunction with one or more of the LED flash, the TOF system 317, the distance/reflectance module 340, the TOF module 355, the AEC module 360, and the AF module 365, adjust the exposure and the focus of the image capture device 302 (specifically the camera 315). The image processor 320 may thus be configured to enable the image capture device 302 to capture an image of the target object or FOV with proper settings (exposure and focus) as desired by the user.

In some embodiments, the image processor 320 may be involved with and/or control the adjustment and estimation of the exposure and focus of the camera 315. The image processor 320 may be configured to control the flash 316, the camera 315, the AEC module 360, the distance/reflectance module 340 to establish an estimated flash exposure (as described in relation to FIG. 1A above). Accordingly, the image processor 320 may monitor the brightness of the target object prior to any illumination from the flash 316 (monitoring the brightness of the target object 210, as referenced in FIG. 2, may include using the camera 315 to view the target object and detect or identify the brightness of the target object or the environment without the light from the flash 316). The image processor 320 may then control the flash 316 to emit a pre-flash level of light and adjust the exposure of the image capture device 302 based on commands and inputs received from the AEC module 360. Once a pre-flash exposure is reached, the image processor 320 may turn off the flash 316 and set the exposure of the image capture device 302 to the estimated flash exposure as calculated by the AEC module 360. Then, the image processor 320 may activate the flash 316 at the main flash light level and capture the image of the target object 210.

Alternatively, or additionally, the image processor 320 may be configured to generate an estimated pre-flash exposure prior to performing the steps discussed above. For example, the image processor 320 may be configured, via one or more of the TOF module 355, the TOF system 317, and the distance/reflectance module 340, to perform a distance and reflection estimation of the target object or the array of points or positions within the FOV. As described herein, the distance and reflection estimation may be based on the amount of time that elapses between when the light (or light signal) is emitted from the light emitter 318 and when the return light signal (after reflecting off the target object or the points or positions within the FOV) is received by the light sensor 319. Before, while, or after the TOF reflectance and estimation is performed, the image processor 320 may also be monitoring the brightness of the target object prior to any illumination from the flash 316, as discussed above in relation to the no-flash period, which may involve monitoring the brightness levels as received by the camera 315 without any illumination from the flash 316 to identify a no-flash exposure of the image capture device 302 (only environmental light). The image processor 320 may then combine the information received from the TOF system 317 (distance and reflectance) with the no-flash exposure to generate a pre-flash exposure estimation. In some embodiments, the pre-flash exposure estimation may involve referencing offline pre-calibration values, which will described in further detail below. In some embodiments, the pre-flash exposure estimate may be accurate enough that the image processor 320 may skip the pre-flash exposure adjustment described above and proceed directly to estimating the flash exposure for use during image capture. In some embodiments, the TOF distance estimation may be combined with the pre-flash exposure adjustment prior to estimating the flash exposure for use during image capture with the main flash.

In some embodiments, the image processor 320 may use the TOF distance estimates provided by the TOF system 317, the TOF module 355, and the distance/reflectance module 340 to improve estimates of the focus of the image capture device 302 and reduce the time needed to adjust the focus of the image capture device 302 (specifically, the camera/lens ("camera") 315) in response to the flash 316 during a pre-flash period where the focus of the camera 315 may be adjusted in response to the brightness of the target object as viewed by the camera 315. Similarly as described above for the exposure estimation, the image processor 320 may be configured to estimate a pre-flash focus of the camera 315, and may use that estimate in conjunction with a reduced pre-flash focus adjustment and estimation period or instead of the pre-flash focus adjustment and estimation period.

Alternatively, or additionally, the image processor 320 may only act in response to instructions from one or more other components or modules of the image capture device 302. For example, the AEC module 360 or the AF module 365 may issue instructions to other components of the image capture device 302 to allow the AEC module 360 to calculate the estimated flash exposure based on either of the methods described above (with or without the TOF system inputs) or to allow the AF module 365 to calculate the estimated focus as described above. Additionally, statistics may be collected using various hardware (such as an image signal processor (ISP)) based on the image data from the sensor at real time. For example, the collected statistics may be sums and averages of all regions on a certain size grid, such as 64×48. The collected statistics may also include histograms of the image data.

Figures 4A, 4B:
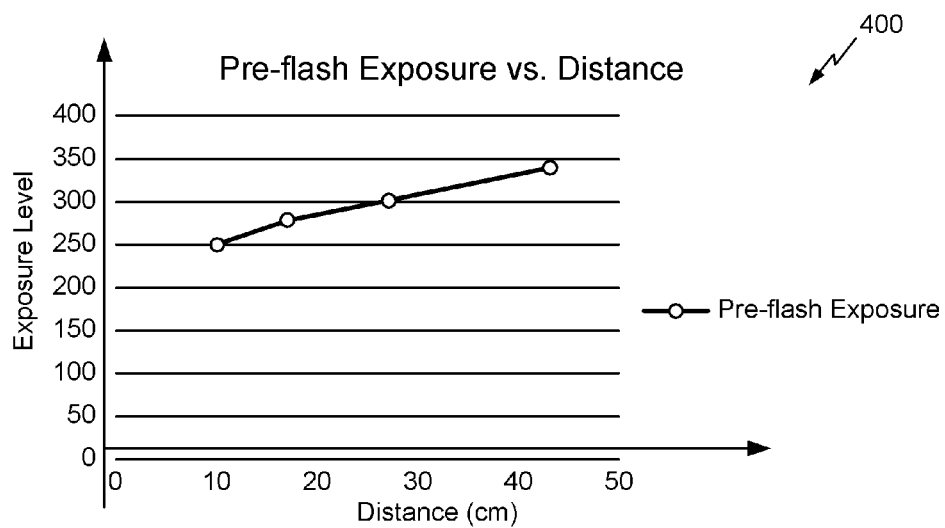
FIG. 4A is a graph that illustrates the relationship between the distance between a target object and an imaging device, and exposure.
FIG. 4B is a chart that is associated with the graph shown in FIG. 4A, and illustrates examples of information relating to distance, information relating to exposure control, and information relating to TOF sensor data.

FIG. 4A is a graph 400 that illustrates the relationship between distance between a target object and an imaging device and exposure. The x-axis of the graph 400 indicates the distance between the target object and the camera in centimeters (cm), while the y-axis of the graph 400 represents the determined "correct" (relative) exposure level for the camera. For example, graph 400 shows examples of the pre-flash exposure information verses distance of a target object. FIG. 4B is a chart 425 that is associated with graph 400 and illustrates examples of information relating to distance 426, examples of information relating to the exposure 427, and examples of information relating to TOF sensor data, such as signal-to-noise ratio (SNR) 431. The graph 400 and chart 425 comprise experimental data identified from tests and comparisons of various aspects disclosed. The chart 425 includes various columns: distance 426 includes the distance between the target object and the camera, three columns corresponding to the LED AEC Estimation data, including exposure 427 depicting the pre-flash exposure for the target object, luma 428 depicting the pre-flash luma of the target object, and pre-flash time column 429 including the amount of time the pre-flash period lasts, in seconds (for example, the time it takes for the camera to reach the exposure of exposure 427). The chart 425 also includes columns comprising TOF system data, including a measured distance 430, including the distance between the target object and the camera as measured by the TOF system (in millimeters) and SNR 431 indicating the signal-noise ratio (SNR) as identified by the TOF system. The chart 425 also has four rows corresponding to different distances (in centimeters). The distances include 10 cm, 17 cm, 27 cm, and 43 cm.

As shown in the graph 400, when the distance between the target object and the camera is small, the pre-flash exposure is lower because when the target object is near the camera, the light from the flash has a greater impact on the brightness of the target object as viewed by the camera, and the pre-flash exposure level is lower. Correspondingly, as the distance between the camera and the target object increases, the exposure levels increase because the light from the flash has a lesser impact on the brightness of the target object as viewed by the camera, and the exposure level must be higher to capture the image at a given brightness level. Thus, as shown in the graph 400 and the chart 425, when the target object is a distance of 10 cm from the camera, the pre-flash exposure of the camera may be 249. When the target object is a distance of 17 cm from the camera, the pre-flash exposure of the camera may be 279. Similarly, when the distance is 27 cm, the pre-flash exposure may be 302, and when the distance is 43 cm, the pre-flash exposure may be 340. The luma (brightness) 428 of the chart 425 indicates the brightness of the target object as viewed by the camera given the pre-flash exposure levels of the exposure 427 at a given distance. The luma is the final luma at the end of the pre-flash process, and it corresponds to the pre-flash exposure index. For example, the pre-flash luma for the target object at the distance of 10 cm is 58, while the pre-flash luma for the target object at the distance of 17 cm is 55, at the distance of 27 cm is 49, and at the distance of 43 cm is at 62. Thus, as described above, as the target object is further from the camera, the resulting pre-flash exposure may be higher to obtain the same or similar brightness levels.

The pre-flash time column 429 provides the time that elapses while the AEC system adjusts the exposure of the camera to the pre-flash exposure level. As seen by comparing the values of the pre-flash time column 429 as they correspond to the various distances, the time decreases as the pre-flash exposure increases. For example, the time is 0.675 seconds when the distance of the target object is 10 cm and the pre-flash exposure if 249, but only 0.447 seconds when the target object is 43 cm from the camera and the pre-flash exposure is 340. This shows that the time lost to the pre-flash exposure adjustment is directly associated with the amount of exposure adjustment performed.

The measured distance 430 indicates the distance between the target object and the camera, as determined by the TOF system. By comparing the measured distance 430 with the distance 426, one sees that the TOF provides an accurate measurement of the distance between the target object and the camera. In this data, the measured valued via the TOF system is off by under a centimeter (27 cm from distance 426 vs. 261.5 mm from measure distance 430). Finally, the SNR 431 depicts the SNR as identified by the TOF system. The SNR decreases from 60.8 at 10 cm distance between the camera and the target object to 1.7 at 43 cm distance between the camera and the target object.

Figures 4C, 4D:
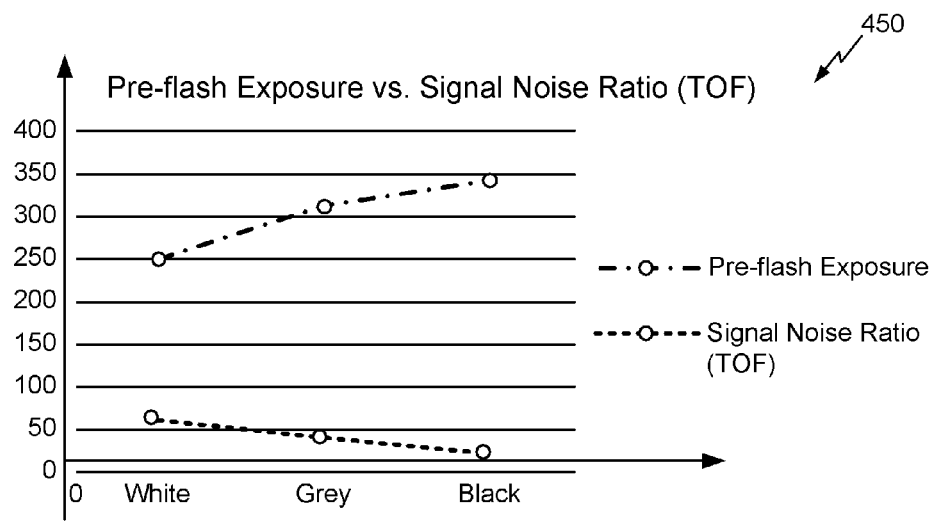
FIG. 4C depicts a graph illustrating pre-flash exposure verses Signal-Noise Ratio, illustrating the pre-flash exposure of target object, at a given distance, having varying reflectance values, in accordance with an exemplary embodiment.
FIG. 4D is a chart illustrating information associated with FIG. 4C.

FIG. 4C depicts a graph 450 illustrating pre-flash exposure verses Signal-Noise Ratio, illustrating the pre-flash exposure of target object, at a given distance, having varying reflectance values, in accordance with an exemplary embodiment. The x-axis of the graph 450 indicates colors (or reflectance values) of the target objects, while the y-axis of the graph 450 represents the exposure level of the camera. FIG. 4D is a chart 475 illustrating information associated with FIG. 4C. The graph 450 and chart 475 comprise experimental data identified from tests and comparisons of various aspects disclosed. The graph 450 depicts the pre-flash exposure vs reflectance of a target object. The chart 475 includes various columns: object 476 includes the color (reflectance) of the target object, three columns corresponding to the LED AEC Estimation data, including pre-flash exposure 477 depicting pre-flash exposure information for the target object, luma 478 depicting pre-flash luma information of the target object, and pre-flash time 479 including information of the amount of time the pre-flash period lasts, in seconds (for example, the time it takes for the camera to reach the exposure of the pre-flash exposure 477). The chart 475 also includes columns comprising TOF system data, including a measured distance 480, including the distance between the target object and the camera as measured by the TOF system (in millimeters) and signal-noise ratio (SNR) 481 indicating the signal-noise ratio (SNR) as identified by the TOF system. The chart 475 also has three rows corresponding to different colors of target objects having different reflectance values (in centimeters). The colors include white, grey, and black.

As shown in the graph 450, when the signal to noise ratio of the target object is greater, the pre-flash exposure value is lower. This may be because, as described above, when the target object has a higher reflectance, the return signal reflecting off the target object is higher, and the target object with a higher reflectance typically needs less exposure than those with lower reflectance. This corresponds to the description above that when the target object is more reflective (e.g., has a higher reflectance), the flash may affect the exposure of the camera.

As shown in the graph 450 and the chart 475, the pre-flash exposure 477 corresponds with the exposure (or color/material) of the target object in object 476. For example, the white object (having a higher reflectance than the grey or black target objects) has a lower exposure value of 249, while the grey and black target objects have exposure values of 313 and 343, respectively. These values conform to the discussion herein that target objects with higher reflectance values may use lower exposure values than target objects with lower reflectance values. Additionally, the luma (brightness) values of luma 478 indicate the amount brightness of the target object(s) as viewed by the camera. As shown, the white target object, the black target object, and the grey target object are all at comparable values (58, 17, and 78, respectively). In some embodiments, an algorithm may be used to manipulate the luma within a reasonable range. For example, the luma values of the white, black, and grey target objects (58, 17, and 78, respectively) may each be considered reasonable values. Additionally, in the chart 475, as the pre-flash brightness of luma 478 increases, the pre-flash time 479 decreases. Additionally, as shown in the graph 450, the SNR of each of the target objects in SNR 481 reduces as the exposure levels of pre-flash exposure 477 increases (exposure level of 249 has SNR of 60.8, while exposures of 313 and 344 have SNRs of 40.4 and 21.2, respectively). As shown in FIG. 10, the SNR may correlate with the reflectance of the target object (for example, the white target object has a higher SNR than the grey target object, which has a higher SNR than the black target object at approximately the same distances). As shown in FIG. 10, the luma and pre-flash time values may have less correlation with the pre-flash exposure than the SNR.

The measured distance 480 indicates the distance between the target object and the camera, as determined by the TOF system. As shown in measured distance 480, the target objects of object 476 are all within 1 cm of each other (white is measured at 100.6 mm, grey at 102.3 mm, and black at 106.1 mm). Finally, the SNR 481 depicts the SNR as identified by the TOF system. The SNR decreases from 60.8 for the white target object to 21.2 for the black target object.

Figure 5B:
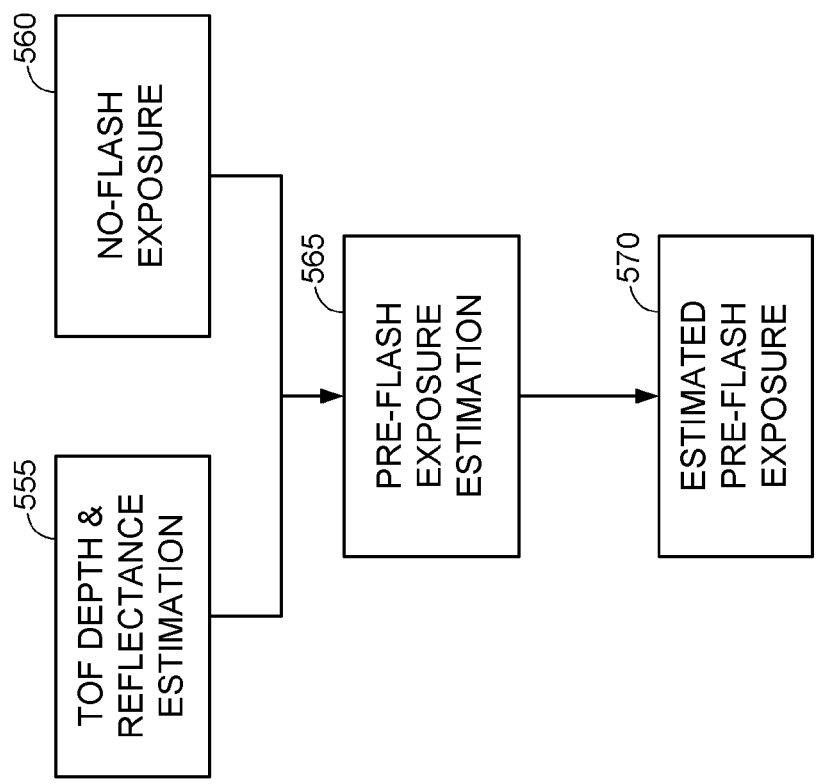
FIG. 5B is a block diagram illustrating an example of a process for estimating a flash exposure based on an identified distance to, and reflectance of, the target object by a camera utilizing a TOF or laser sensor in conjunction with an AEC module.
Figure 5A:
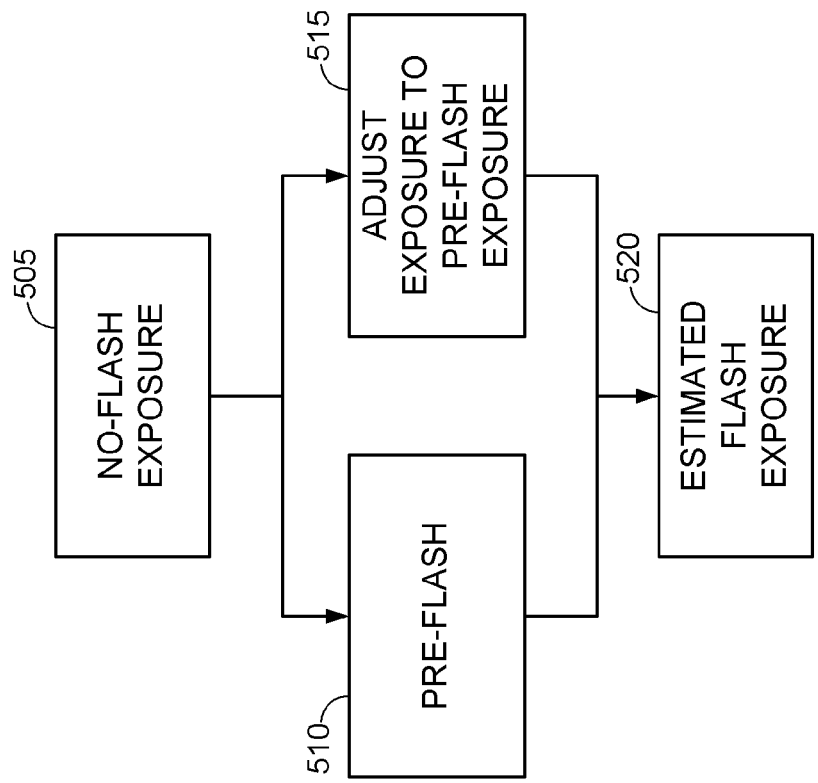
FIG. 5A is a block diagram illustrating an example of a process for estimating a flash exposure based on LED flash automatic exposure correction.

FIG. 5A depicts a block diagram illustrating a process 500, that an imaging device may be configured to implement, for estimating a flash exposure based on LED flash automatic exposure correction using a camera not utilizing a TOF or laser sensor, as described above. As depicted, the process 500 includes four blocks involved in the identification of the estimated flash exposure, described above. The process 500 begins with a determination of a no-flash exposure at block 505. The no-flash exposure of block 505 may correspond to the discussion above of the identification of the exposure of the camera when the flash is not active at any level. For example, this may occur when the camera is turned on but not emitting light from the flash 316. The no-flash exposure may be identified and stored for later use.

Once the no-flash exposure is determined at block 505, the process 500 proceeds to blocks 510 and 515, which may operate simultaneously.

Block 510 includes activating the flash of the camera at a pre-flash level. This may include, for example, controlling the flash to illuminate a target object at less than a full flash level. While the flash is activated at the pre-flash level, the block 515 adjusts the exposure of the camera to a pre-flash exposure level. In some embodiments, the pre-flash exposure level may be adjusted so that the luma is within a specified range (for example, as described above, each of 58, 17, and 78 may be within the specified range). In some embodiments, the reflectance, the distance of the target object, and the pre-flash exposure level may be adjusted to bring the luma value within the specified range. Such adjustment may be performed by the AEC module described above, or by any other module configured to control the exposure of the camera. During the blocks 510 and 515, the camera may not capture any images. Instead, the camera may just monitor the brightness of the target object and/or the environment and adjust its exposure according to the monitored brightness to a target exposure level. Additionally, the pre-flash exposure may be stored for later use. For example, the AEC module 360 may use a pre-flash and main flash brightness ratio (some value pre-defined/determined) together with the stored pre-flash exposure level to estimate a desired exposure level on the final flash image. In some embodiments, the main flash may be brighter than pre-flash, (brightness ratio >1), so the AEC module 360 will further lower the exposure level from the pre-flash exposure level so that the final image can be properly exposed. In some embodiments, the adjustment of the exposure of the camera may be performed by an exposure algorithm. Once the pre-flash exposure is determined at block 515, the process 500 proceeds to block 520.

Block 520 includes estimating the exposure of the camera for the main flash illumination. This may be performed by the exposure algorithm or the AEC module described above. The exposure algorithm may be configured to, utilizing the no-flash information acquired at block 505 and the pre-flash exposure information acquired at block 515, compute brightness of the target object (specifically, the brightness of the frame including the target object, as viewed by the camera while illuminated by the LED) via the collected statistics information described above. The exposure algorithm may further extrapolate the brightness of the target object and the scene when illuminated by the main flash driving current (substantially larger than the pre-flash driving current(s)). This extrapolated brightness may represent an estimated brightness level for the target object or scene that is expected when the main flash is illuminated under full current (for example, the main flash driving current). The extrapolated brightness may then be used to set the exposure of the camera to a proper level such that the target or scene is not over or under exposed (for example, so that the capture target or scene is at the proper brightness). Once the estimated flash exposure is determined, the process 500 ends. In some embodiments, the identified brightness and/or exposure may be stored for later use.

FIG. 5B is a block diagram illustrating a process 550, that an imaging device may be configured to implement, for estimating a flash exposure based on a determined distance and reflectance of the target object by a camera utilizing a TOF system or laser sensor in conjunction with an AEC module, for example, as described above. As depicted, the process 550 includes four blocks involved in the identification of the estimated pre-flash, though an optional fifth block may be included (though not shown herein). The process 550 begins with blocks 555 and 560 operating simultaneously. Block 555 includes estimating a distance to the target object using the TOF system.

In some embodiments, the determination of the distance of the target object may include only a single distance estimation based on the center of the target object or the center of the FOV of the camera. In some embodiments, the distance of the target object may be determined using an array of distance information for various points distributed across the FOV of the camera. For example, the TOF system may emit to and sense light from various locations around the FOV to generate the array of distance information. In some embodiments, the camera may then average the distance information from the array to determine a distance of the image. In some embodiments, the camera may identify the distance image for the target object at a specific location within the FOV (as selected by the user, for example, when selecting a focus point, etc.) based on the distance information from the array at a point in the array corresponding to the location of the target object within the FOV.

An imaging device may be configured to determine reflectance of a target object using the TOF system. The reflectance may be determined based on the returned energy of the light emitted from a TOF emitter and received by a TOF sensor. The greater the returned energy, the greater the reflectance of the target object, as described above. Similar to the distance information above, a determination of the reflectance may include determination of a reflectance of an array of the FOV, where the reflectance of multiple locations within the FOV may be determined and/or calculated.

Simultaneously with the TOF system distance estimations, a camera may be configured to identify the no-flash exposure at block 560. The no-flash exposure at block 560 may be similar or identical to the no-flash exposure at block 505 described above in relation to FIG. 5A. The no-flash exposure of block 560 may be determined simultaneously with the TOF distance estimation of block 555 because the TOF system does not utilize light that effects the brightness of the target object or FOV. Accordingly, light (for example, IR light) emitted by the TOF system does not affect the brightness of the target object or FOV as viewed by the camera during the exposure detection, and thus the no-flash exposure detection may be performed simultaneously with the TOF system distance estimation. In some embodiments, exposure measurements by the camera may be performed simultaneously with any TOF system estimations. Once the blocks 555 and 560 are complete, the process 550 proceeds to block 565.

The camera of FIG. 5B estimates the pre-flash exposure at block 565. The camera may use the TOF distance estimation identified at block 555 with the no-flash exposure of block 560 to calculate an initial pre-flash exposure prior to the pre-flash period, as described above. Applying the estimated initial pre-flash exposure before entering the pre-flash period may reduce the amount of time the camera may spend in the pre-flash period, because the exposure of the camera will be at a level closer to proper pre-flash exposure, thus reducing the exposure adjustment necessary during the pre-flash period. As described above, when the camera uses the pre-flash period to adjust a no-flash exposure to reach a pre-flash exposure, the camera may adjust the exposure a great deal dependent upon at least the environmental lighting, the distance between the target object and the camera, and the reflectance of the target object. However, since the blocks 555 and 560 provide the distance and the reflectance of the target object, the block 565 can provide a more accurate estimate of the exposure of the camera needed to capture the image of the target device at the desired brightness level, and the exposure of the camera should need to be adjusted less from the pre-flash exposure estimation level.

In some embodiments, the pre-flash exposure estimation of block 565 may be pre-calibrated. In some embodiments, the offline pre-calibration may involve identifying the exposure of the camera when capturing the target object at various distances, thus building a library of exposure values for a target object at various distances. In some embodiments, the offline pre-calibration may comprise identifying the exposure values of the camera when capturing various target objects having a varying reflectance at the same distance, thus building a library of exposure values for a distance with varying reflectance values. In some embodiments, the pre-calibration may provide information that helps the pre-flash exposure estimation of block 565 develop more accurate estimates of the pre-flash exposure. In some embodiments, a library or other database may be generated by capturing target objects at various distances with various reflectance values. The library or database may cover all scenarios and may allow the algorithm to accurately identify the correct exposure level in the library or database, given input distance and reflectance or SNR. For example, the pre-calibration information may allow the block 565 to better estimate the pre-flash exposure when provided with the TOF distance estimation, as block 565 may review the exposure values in the calibration information for the estimated distance and the estimate reflectance. The better estimate may allow the pre-flash exposure estimation of block 565 to more accurately estimate the pre-flash exposure value, thus further shortening the amount of time the camera may spend in the pre-flash period.

Once the block 565 completes the pre-flash exposure estimation, the process 550 proceeds to block 570, where the camera enters the pre-flash period described above (for example, enters blocks 510 and 515 of process 500). In some embodiments (not shown in this figure), the pre-flash exposure estimation of block 565 may provide an accurate pre-flash exposure estimate. Accordingly, the process 550 may skip the pre-flash exposure adjustment period and proceed directly to image capture during the main flash period. Thus, in some embodiments, the pre-flash exposure estimation of block 565 may comprise the main flash exposure estimation block using the TOF distance and reflection estimate and the no-flash exposure of blocks 555 and 560, respectively. Such elimination of the pre-flash period altogether may greatly reduce the latencies introduced by the AEC process described above when not used with the TOF system.

In some embodiments, the camera may use the TOF distance estimation of block 555 to better estimate a pre-flash focus. For example, when a camera is preparing to capture an image, the camera may use information from the TOF distance estimation to generate a more accurate pre-flash focus estimate that reduces the amount of time the camera spends focusing on the target object, but the camera may still proceed to the pre-flash period.

Figure 6:
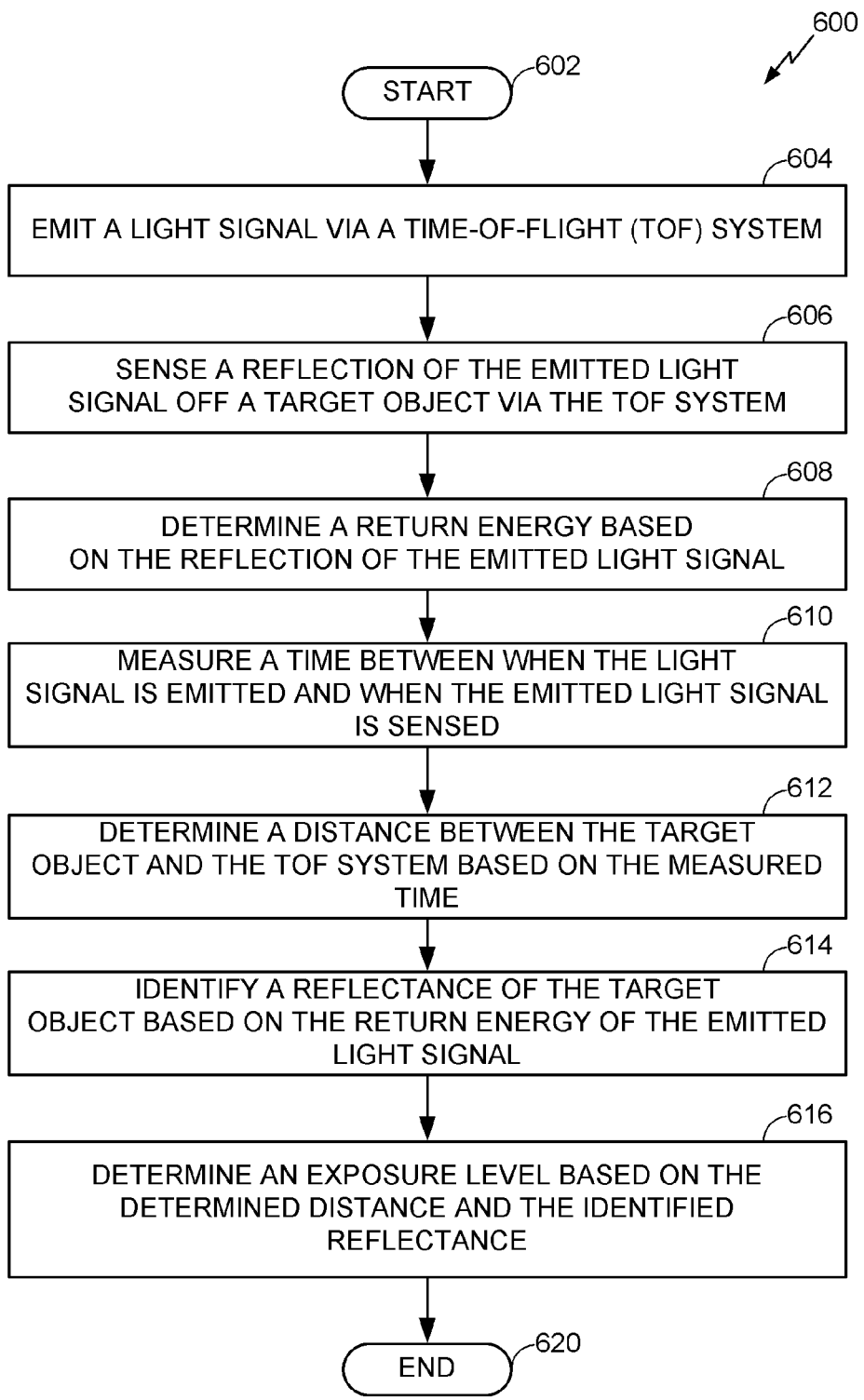
FIG. 6 is a flowchart illustrating an example of a method for determining exposure, according to some embodiments.

FIG. 6 is a flowchart illustrating an example of a method 600 for determining exposure, according to some embodiments. The method 600 may start at block 602 and proceed to block 604. At block 604, the method 600 may emit a light signal toward a target object via a TOF system. The TOF system may comprise the TOF system 214/317 (including both the light emitter and light sensor), as described above in relation to FIGS. 2 and 3. In some embodiments, the TOF system may be part of an image capture device, such as the image capture devices 202 and 302 shown in FIGS. 2 and 3, respectively. The TOF system may be controlled via a processor (for example, one of image processor 320 or device processor 350) or via any of the modules described above in relation to FIG. 3. Once the light signal has been generated and emitted toward the target object, the method 600 proceeds to block 606.

At block 606, the method 600 senses a reflection of the emitted light signal off the target object via the light sensor, for example the light sensor 220/318 as referenced in FIGS. 2 and 3, respectively. In some embodiments, the light sensor of the TOF system may communicate information regarding the received reflection to the processor of the image capture device or may store the information in a memory, such as working memory 305 or electronic storage module 310. Alternatively, the information from the light sensor may be communicated to any of the modules in the image capture device 302 as shown in FIG. 3. Once the reflected light is sensed by the light sensor of the TOF system, the method 600 progresses to block 608.

At block 608, the method 600 determines a return energy based on the reflection of the emitted light signal as sensed by the light sensor. The return energy may be determined by the light sensor itself or may be determined by one of the processors. Alternatively, or additionally, the return energy may be determined based on the reflection of the emitted light signal by one or more of the modules of the image capture device 302 of FIG. 3, such as the distance/reflectance module 340 or the TOF module 355, for example. Once the method 600 determines a reflected energy based on the reflection of the emitted light signal, the method 600 proceeds to block 610. At block 610, the method 600 measures a time between when the light signal is emitted by the light emitter of the TOF system and when the light sensor of the TOF system senses the reflection of the emitted light signal off of the target object. In some embodiments, the measurement of the time may be performed by the processor or by one of the modules of the image capture device 302 of FIG. 3, for example, the distance/reflectance module 340 or the TOF module 355. In some embodiments, the measurement of the time may involve the clock 351. In some embodiments, the results of the measurement may be stored in the memory or communicated to the processors or any of the associated modules. Once the time has been measured, the method 600 progresses to block 612.

At block 612, the method 600 determines a distance between the target object and the TOF system based on the measured time. In some embodiments, this determination may be performed by the TOF system itself or one of the processors. In some embodiments, the determination may be made by the distance/reflectance module 340 of the image capture device 302. In some embodiments, the determined distance may be stored in one of the memories or may be immediately used by one of the modules or the processors. Once the block 612 is complete, the method 600 proceeds to block 614. At block 614, the method 600 identifies a reflectance of the target object based on the returned energy. In some embodiments, the reflectance may be identified by the distance/reflectance module 340 or the TOF system. In some embodiments, one of the processors or one of the other modules may be configured to identify the reflectance of the target object based on the sensed reflection and the identified ambient or no-flash lighting. In some embodiments, the reflectance may be determined based on the returned energy as sensed by the light sensor. In some embodiments, identifying the reflectance may also incorporate one or more other measured, identified, or determined parameter (such as the ambient light exposure, etc.). Once the reflectance is determined at block 614, the method 600 proceeds to block 616.

At block 616, the method 600 determines an exposure level of the target object based on the determined distance and the identified reflectance. In some embodiments, the determination of the exposure level may be performed by the AEC module 360 or one of the processors or one of the other modules of FIG. 3. In some embodiments, the exposure level may be determined by the light sensor. In some embodiments, the exposure level may be stored in one of the memories or may be immediately communicated to one of the modules of the image capture device 302 of FIG. 3. Once the exposure level is determined, the method 600 ends at block 618.

In some embodiments, the determined, identified, measured, or generated values or amounts described above may be displayed, for example on the display 325, as referenced by FIG. 3, or stored in the working memory 305 or the electronic storage module 310 or processed by one of the processors.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

As used herein, the term interface may refer to hardware or software configured to connect two or more devices together. For example, an interface may be a part of a processor or a bus and may be configured to allow communication of information or data between the devices. The interface may be integrated into a chip or other device. For example, in some embodiments, an interface may comprise a receiver configured to receive information or communications from a device at another device. The interface (e.g., of a processor or a bus) may receive information or data processed by a front end or another device or may process information received. In some embodiments, an interface may comprise a transmitter configured to transmit or communicate information or data to another device. Thus, the interface may transmit information or data or may prepare information or data for outputting for transmission (e.g., via a bus).

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. An imaging apparatus, comprising:
    a time-of-flight (TOF) system configured to determine a distance to a target object and determine a reflectance of the target object;
    a flash circuit configured to emit a pre-flash and a main flash to illuminate the target object; and
    a processor in communication with the TOF system and the flash circuit, the processor configured to:
        determine a first exposure level based on the distance to the target object and the reflectance of the target object,
        control the flash circuit to emit the pre-flash at an output level based on the first exposure level,
        determine a second exposure level of the target object based on the illumination of the target object by the pre-flash,
        control the flash circuit to emit the main flash, the main flash having an output level based on the second exposure level, and
        control a camera of the imaging apparatus to capture an image of the target object while the target object is illuminated by the main flash.

2. The apparatus of claim 1, wherein the processor is configured to determine a brightness level of the target object under ambient light conditions.

3. The apparatus of claim 2, wherein the processor is further configured to determine the first exposure level based at least in part on the brightness of the target object under ambient light conditions.

4. The apparatus of claim 1, further comprising the camera.

5. The apparatus of claim 1, further comprising an automatic exposure control (AEC) module configured to adjust an exposure of the camera based on the first and second determined exposure levels.

6. The apparatus of claim 1, further comprising an automatic focus (AF) module configured to adjust a focus of the camera using the distance to the target object.

7. The apparatus of claim 1, wherein the TOF system is configured to generate distance information points across a field of view (FOV) of the camera.

8. The apparatus of claim 7, wherein the TOF system is configured to detect a position of the target object in the FOV of the camera using the distance information.

9. The apparatus of claim 1, wherein the processor is further configured to determine the first exposure level based on the reflectance of the target object, the distance of the target object, and ambient lighting conditions.

10. The apparatus of claim 1, wherein the processor is further configured to determine the first exposure level based on calibration information, wherein the calibration information comprises information related to exposure levels of a first object captured at a plurality of distances or information related to exposure levels of a plurality of objects at a fixed distance, each of the plurality of objects having a different reflectance.

11. The apparatus of claim 1, wherein the TOF system comprises:
    an emitter configured to emit a light signal, and
    a sensing system configured to sense a reflection of the emitted light signal from a target object, wherein the TOF system is further configured to determine a return energy based on the sensed reflection of the emitted light signal.

12. The imaging apparatus of claim 11, wherein the processor is further configured to identify a signal-to-noise ratio (SNR) of the target object based on the return energy, and wherein the SNR corresponds to the reflectance of the target object.

13. The apparatus of claim 11, further comprising a clock coupled to the TOF system, wherein the clock is configured to determine a time between when the light signal is emitted and when the return energy of the emitted light signal is sensed by the sensing system.

14. The apparatus of claim 13, wherein the processor is in communication with the clock and wherein the processor is configured to determine the distance between the target object and the TOF system based on the determined time.

15. The apparatus of claim 11, wherein the processor is configured to determine the reflectance of the target object based on the return energy of the emitted light signal.

16. The apparatus of claim 11, wherein the emitted light signal is an infra-red (IR) light signal.

17. A method for capturing an image, comprising:
    determining a distance to a target object and a reflectance of the target object;
    determining a first exposure level based on the distance to the target object and the reflectance of the target object;
    controlling a flash circuit to emit a pre-flash at an output level based on the first exposure level;
    determining a second exposure level of the target object based on the illumination of the target object by the pre-flash;
    controlling the flash circuit to emit a main flash, the main flash having an output level based on the second exposure level; and controlling a camera to capture an image of the target object when it is illuminated by the main flash.

18. The method of claim 17, further comprising determining a brightness level, via a processor, of the target object under ambient light conditions.

19. The method of claim 18, further comprising determining the first exposure level based on the brightness of the target object under ambient light conditions.

20. The method of claim 18, wherein controlling the camera further comprises adjusting the camera to capture the image at the second exposure level.

21. The method of claim 20, further comprising adjusting, via an automatic exposure control (AEC) module, an exposure of the camera based on the first and second determined exposure levels.

22. The method of claim 20, further comprising adjusting, via an automatic focus (AF) module, a focus of the camera based on the distance of the target object.

23. The method of claim 17, further comprising determining the first exposure level based on the reflectance of the target object, the distance between the target object and the TOF system, and ambient lighting conditions.

24. The method of claim 17, further comprising determining the first exposure level based on calibration information, wherein the calibration information comprises information related to exposure levels of a first object captured at a plurality of distances or information related to exposure levels of a plurality of objects at a fixed distance, each of the plurality of objects having a different reflectance.

25. The method of claim 17, further comprising:
emitting a light signal via a time-of-flight (TOF) system;
sensing a reflection of an emitted light signal from the target object via the TOF system;
determining, using a clock coupled to the TOF system, a time between when the light signal is emitted and when the reflection of the emitted light signal is sensed,
wherein the distance to the target object from the TOF system is determined based on the determined time.

26. The method of claim 25, wherein the emitted light signal is an infra-red (IR) light signal.

27. The method of claim 17, further comprising:
emitting a light signal via a time-of-flight (TOF) system;
sensing a reflection of an emitted light signal from the target object via the TOF system;
determining a return energy based on the sensed reflection of the emitted light signal;
wherein the reflectance of the target object is determined based on the return energy of the emitted light signal.

28. The method of claim 27, wherein the emitted light signal is an infra-red (IR) light signal.

29. The method of claim 27, further comprising identifying a signal-to-noise ratio (SNR) of the target object based on the return energy, wherein the SNR corresponds to the reflectance of the target object.

30. An imaging apparatus, comprising:
means for determining a distance to a target object;
means for determining a reflectance of the target object;
means for determining a first exposure level based on the distance to the target object and the reflectance of the target object;
means for emitting a pre-flash at an output level based on the first exposure level;
means for determining a second exposure level based on the illumination of the target object by the pre-flash;
means for emitting a main flash having an output level based on the second exposure level; and
means for causing a camera to capture an image of the target object when it is illuminated by the main flash.

31. The imaging apparatus of claim 30, further comprising a means for determining a brightness level of the target object under ambient light conditions.

32. The imaging apparatus of claim 31, wherein the first exposure level determining means is configured to determine the first exposure level based on the brightness of the target object under ambient light conditions.

33. The imaging apparatus of claim 31, further comprising the camera.

34. The imaging apparatus of claim 33, further comprising means for automatic exposure control (AEC) of the camera based on the first and second determined exposure levels.

35. The imaging apparatus of claim 33, further comprising means for automatically focusing (AF) the camera based on the first and second determined exposure levels.

36. The imaging apparatus of claim 30, wherein the first exposure level determining means is further configured to determine the first exposure level based on the reflectance of the target object, the distance of the target object, and ambient lighting conditions.

37. The imaging apparatus of claim 30, wherein the first exposure level determining means is configured to determine the first exposure level based on calibration information, wherein the calibration information comprises information related to exposure levels of a first object captured at a plurality of distances or information related to exposure levels of a plurality of objects at a fixed distance, each of the plurality of objects having a different reflectance.

38. The apparatus of claim 30, further comprising:
means for identifying a time-of-flight (TOF) of a light signal comprising:
means for emitting a light signal,
means for sensing the reflection of the emitted light signal from the target object, and
means for determining a time between when the light signal is emitted and when the return energy of the emitted light signal is sensed,
wherein the means for determining the distance to the target object determines the distance to the target object based on the measured determined time.

39. The apparatus of claim 38, wherein the emitted light signal is an infra-red (IR) light signal.

40. The apparatus of claim 30, further comprising:
means for identifying a time-of-flight (TOF) of a light signal comprising:
means for emitting a light signal,
means for sensing the reflection of the emitted light signal from the target object, and
means for determining a return energy based on the sensed reflection of the emitted light signal,
wherein the means for determining the reflectance of the target object determines the reflectance of the target object based on the return energy of the emitted light signal.

41. The apparatus of claim 40, wherein the emitted light signal is an infra-red (IR) light signal.

42. The imaging apparatus of claim 40, wherein the reflectance identifying means is further configured to identify a signal-to-noise ratio (SNR) of the target object based on the return energy, wherein the SNR corresponds to the reflectance of the target object.

43. A computer program product comprising a computer readable storage medium encoded thereon with instructions that when executed cause an apparatus to perform a method of capturing an image, said method comprising:

determining a distance to a target object and a reflectance of the target object;

determining a first exposure level based on the distance to the target object and the reflectance of the target object;

controlling a flash circuit to emit a pre-flash at an output level based on the first exposure level;

determining a second exposure level based on the illumination of the target object by the pre-flash;

controlling the flash circuit to emit a main flash based on the second exposure level; and capturing the image of the target object, via a camera, when it is illuminated by the main flash.

* * * * *